United States Patent
Li et al.

(10) Patent No.: US 10,970,951 B2
(45) Date of Patent: Apr. 6, 2021

(54) DATA MANAGEMENT METHOD, APPARATUS, DEVICE, SYSTEM AND STORAGE MEDIUM FOR SMART LOCK

(71) Applicant: SHENZHEN GOODIX TECHNOLOGY CO., LTD., Shenzhen (CN)

(72) Inventors: Qingbin Li, Shenzhen (CN); Zhi Wang, Shenzhen (CN); Hai Bai, Shenzhen (CN); Wei Zhou, Shenzhen (CN); Guorong Ma, Shenzhen (CN); Xincheng Zeng, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/681,721

(22) Filed: Nov. 12, 2019

(65) Prior Publication Data
US 2020/0250909 A1  Aug. 6, 2020

(30) Foreign Application Priority Data
Feb. 1, 2019  (CN) .......................... 201910105801.7

(51) Int. Cl.
*G05B 19/00*  (2006.01)
*G05B 23/00*  (2006.01)
(Continued)

(52) U.S. Cl.
CPC ......... *G07C 9/00563* (2013.01); *G06F 16/21* (2019.01); *G06F 16/2379* (2019.01); *G06F 16/258* (2019.01); *H04W 88/02* (2013.01)

(58) Field of Classification Search
CPC ... G07C 9/00563; G06F 16/21; G06F 16/258; G06F 16/2379; H04W 88/02
(Continued)

(56) References Cited

U.S. PATENT DOCUMENTS 9,330,511 B2  5/2016  Webber
2013/0342314 A1*  12/2013  Chen .................. G07C 9/00309
340/5.65
(Continued)

FOREIGN PATENT DOCUMENTS

| CN | 104660719 A | * | 5/2015 |
| CN | 104660719 A | | 5/2015 |
(Continued)

OTHER PUBLICATIONS

Extended European search report of corresponding EP application.
(Continued)

*Primary Examiner* — Tanmay K Shah
(74) *Attorney, Agent, or Firm* — J.C. Patents

(57) ABSTRACT

The present application provides a data management method, apparatus, device, system and storage medium for a smart lock. The smart lock includes: respective databases corresponding to N unlock modes, N is an integer greater than 1, and the method includes: receiving a registration command transmitted by a terminal device; acquiring first unlock information of a current unlock mode according to the registration command; and storing the first unlock information of the current unlock mode into a database corresponding to the current unlock mode. Therefore, unlock efficiency of the smart lock is improved.

17 Claims, 11 Drawing Sheets

(51) Int. Cl.

| | | |
|---|---|---|
| *G06F 7/00* | (2006.01) | |
| *G06F 7/04* | (2006.01) | |
| *G06K 19/00* | (2006.01) | |
| *G08B 29/00* | (2006.01) | |
| *G08C 19/00* | (2006.01) | |
| *H04B 1/00* | (2006.01) | |
| *H04B 3/00* | (2006.01) | |
| *H04L 9/14* | (2006.01) | |
| *H04L 9/32* | (2006.01) | |
| *H04Q 1/00* | (2006.01) | |
| *H04Q 9/00* | (2006.01) | |
| *G07C 9/00* | (2020.01) | |
| *G06F 16/21* | (2019.01) | |
| *G06F 16/23* | (2019.01) | |
| *G06F 16/25* | (2019.01) | |
| *H04W 88/02* | (2009.01) | |

(58) Field of Classification Search
USPC .......................................................... 340/5.2
See application file for complete search history.

(56) References Cited

U.S. PATENT DOCUMENTS

| | | | |
|---|---|---|---|
| 2016/0065653 A1* | 3/2016 | Chen | ...................... H04L 67/34 |
| | | | 715/735 |
| 2018/0165442 A1 | 6/2018 | Liu | |
| 2019/0191374 A1* | 6/2019 | Murali | .............. H04W 52/0229 |

FOREIGN PATENT DOCUMENTS

| | | |
|---|---|---|
| CN | 107181540 A | 9/2017 |
| CN | 107975296 A | 5/2018 |
| CN | 207526252 U | 6/2018 |
| CN | 207568353 U | 7/2018 |
| CN | 208271280 U | 12/2018 |

OTHER PUBLICATIONS

The first Office Action of CN application No. 201910105801.7.
"Definitive Guide to Low Power Bluetooth Development", by Robin Heydon, china Machine Press, Jun. 2004.

* cited by examiner

DATA MANAGEMENT METHOD, APPARATUS, DEVICE, SYSTEM AND STORAGE MEDIUM FOR SMART LOCK

CROSS-REFERENCE TO RELATED APPLICATIONS

The present application claims priority to Chinese application number 201910105801.7, filed on Feb. 1, 2019, which is incorporated by reference in its entirety.

TECHNICAL FIELD

The present application relates to a field of smart lock technologies and, in particular, to a data management method, an apparatus, a device, a system and a storage medium for a smart lock.

BACKGROUND

At present, there are various unlock modes for the smart lock, including: an unlock mode based on Near Field Communication (NFC), a digital password unlock mode, a fingerprint password unlock mode and the like.

For any of the above unlock modes, the smart lock identifies unlock information by a process including: the smart lock acquires unlock information and matches it with unlock information in a database; when the matching is successful, a micro controller unit (MCU) in the smart lock controls an actuator to actuate the smart lock to be in an open state. Among others, the unlock modes such as the unlock mode based on NFC, the digital password unlock mode, the fingerprint password unlock mode and the like correspond to a same database. Based on this, for any of the above unlock modes, the smart lock is performing, in the database, a process for matching unlock information, and since there is a large amount of data in the database, a problem of low unlock efficiency is incurred for the smart lock.

SUMMARY

The present application provides a data management method, an apparatus, a device, a system and a storage medium for a smart lock. Therefore, unlock efficiency of the smart lock is improved.

In a first aspect, the present application provides a data management method for a smart lock, where the smart lock includes respective databases corresponding to N unlock modes, N is an integer greater than 1, and the method includes: receiving a registration command transmitted by a terminal device; acquiring first unlock information of a current unlock mode according to the registration command; and storing the first unlock information of the current unlock mode into a database corresponding to the current unlock mode.

The present application has the following advantages: since the smart lock includes a plurality of unlock modes, and each unlock mode corresponds to one database, that is, databases corresponding to the plurality of unlock modes are independent of each other, based on this, for any unlock mode, the smart lock only needs to perform, in a database corresponding to the unlock mode, a process for matching unlock information, so that the unlock efficiency of the smart lock is improved. Further, in the embodiments of the present application, a binding relationship is established among the terminal device, the smart lock, and a server, based on this, a user may implement registration of unlock information simply through the terminal device, and thus the user experience is improved.

In a possible design, after the storing the first unlock information of the current unlock mode into a database corresponding to the current unlock mode, the method further includes: acquiring second unlock information of the current unlock mode; identifying the second unlock information of the current unlock mode in the database corresponding to the current unlock mode; and controlling the smart lock to be in an open state when the second unlock information of the current unlock mode is successfully identified. Therefore, the unlock efficiency of the smart lock is improved.

In a possible design, the method further includes: receiving a delete command transmitted by the terminal device, where the delete command includes the first unlock information of the current unlock mode; and deleting the first unlock information of the current unlock mode from the database corresponding to the current unlock mode according to the delete command. Accordingly, management performed by the user on the smart lock through the terminal device is achieved, thereby improving user experience.

In a possible design, the method further includes: generating an operation record from a user for the smart lock; and transmitting the operation record to a server to allow the server to store the operation record, or transmitting the operation record to the terminal device so that the user queries the operation record of the smart lock through the terminal device. Therefore, the server or the terminal device is allowed to acquire, in real time, the operation record from the user for the smart lock, thereby improving user experience.

In a possible design, the smart lock communicates with the terminal device through a Bluetooth mode, correspondingly, the transmitting the operation record to the terminal device includes: transmitting the operation record to the terminal device through the Bluetooth mode; or, the smart lock communicates with the terminal device through 2G, 3G, 4G, NB-IoT, LoRa or WiFi, correspondingly, the transmitting the operation record to the terminal device includes: transmitting the operation record to the server through the 2G, 3G, 4G, NB-IoT, LoRa or WiFi, so that the server forwards the operation record to the terminal device through the 2G, 3G, 4G or Internet of Things.

In a possible design, when the smart lock communicates with the terminal device through the Bluetooth mode, an application layer protocol used by the smart lock and the terminal device is a constrained application protocol COAP; when the smart lock communicates with the terminal device through the 2G, 3G, 4G, NB-IoT, LoRa or WiFi, an application layer protocol used by the smart lock and the server is a COAP or a message queuing telemetry transport MQTT protocol.

In a possible design, when the smart lock communicates with the terminal device through the Bluetooth mode, a data packet transmitted between the smart lock and the terminal device successively includes: a preamble of data to be transmitted, a length field of the data to be transmitted, the data to be transmitted, and a cyclic redundancy check CRC calculated according to the length field of the data to be transmitted and the data to be transmitted.

In a possible design, the smart lock includes a plurality of modules; correspondingly, the method further includes: receiving a query request transmitted by the terminal device, where the query request is used to request to query an operating state of at least one of the plurality of modules;

and transmitting a query response to the terminal device, where the query response includes an operating state of at least one of the plurality of modules. Therefore, the user is allowed to query, in real time, an operating state of a query module to be queried, thereby improving user experience.

In a possible design, the N unlock modes include at least two of the following: an unlock mode based on near field communication NFC, a digital password unlock mode, and a fingerprint unlock mode.

A data management method as well as a data management apparatus, device, system, storage medium, and computer program product on a terminal device side will be provided hereunder, for effects thereof, reference may be made to effects of the data management method on the smart lock side as described above, details will not be described hereunder again.

In a second aspect, the present application provides a data management method for a smart lock, where the smart lock includes: respective databases corresponding to N unlock modes, N is an integer greater than 1, and the method includes: acquiring a user operation on a registration interface; generating a registration command according to the user operation, where the registration command is used to acquire first unlock information of a current unlock mode; and transmitting the registration command to the smart lock, where the registration command is used to acquire first unlock information of a current unlock mode, and the first unlock information of the current unlock mode is stored in a database corresponding to the current unlock mode.

In a possible design, the method further includes: transmitting second unlock information of the current unlock mode to the smart lock, where the second unlock information of the current unlock mode is used to determine whether to control the smart lock to be in an open state.

In a possible design, the method further includes: transmitting a delete command to the smart lock, where the delete command includes the first unlock information of the current unlock mode, and the delete command is used to delete the first unlock information of the current unlock mode from the database corresponding to the current unlock mode.

In a possible design, the method further includes: acquiring an operation record of the smart lock; and displaying the operation record of the smart lock so that the user queries the operation record of the smart lock.

In a possible design, the smart lock communicates with the terminal device through a Bluetooth mode, correspondingly, the acquiring an operation record of the smart lock includes: receiving, through the Bluetooth mode, the operation record transmitted by the smart lock; or, the smart lock communicates with the terminal device through 2G, 3G, 4G, NB-IoT, LoRa or WiFi, correspondingly, the acquiring an operation record of the smart lock includes: receiving, through the 2G, 3G, 4G, NB-IoT, LoRa or WiFi, the operation record forwarded by a server.

In a possible design, when the smart lock communicates with the terminal device through the Bluetooth mode, an application layer protocol used by the smart lock and the terminal device is a COAP; when the smart lock communicates with the terminal device through the 2G, 3G, 4G, NB-IoT, LoRa or WiFi, an application layer protocol used by the smart lock and the server is a COAP or an MQTT protocol.

In a possible design, when the smart lock communicates with the terminal device through the Bluetooth mode, a data packet transmitted between the smart lock and the terminal device successively includes: a preamble of data to be transmitted, a length field of the data to be transmitted, the data to be transmitted, and a CRC calculated according to the length field of the data to be transmitted and the data to be transmitted.

In a possible design, the smart lock includes a plurality of modules; correspondingly, the method further includes: transmitting a query request to the smart lock, where the query request is used to request to query an operating state of at least one of the plurality of modules; and receiving a query response transmitted by the terminal device, where the query response includes an operating state of at least one of the plurality of modules.

In a possible design, the N unlock modes include at least two of the following: an unlock mode based on NFC, a digital password unlock mode, and a fingerprint unlock mode.

In a third aspect, the present application provides a data management apparatus for a smart lock, where the smart lock includes: respective databases corresponding to N unlock modes, N is an integer greater than 1, and the apparatus includes: a receiving module, configured to receive a registration command transmitted by a terminal device; an acquiring module, configured to acquire first unlock information of a current unlock mode according to the registration command; and a storage module, configured to store the first unlock information of the current unlock mode into a database corresponding to the current unlock mode.

In a fourth aspect, the present application provides a data management apparatus for a smart lock, where the smart lock includes: respective databases corresponding to N unlock modes, N is an integer greater than 1, and the apparatus includes: an acquiring module, configured to acquire a user operation on a registration interface; a generating module, configured to generate a registration command according to the user operation, where the registration command is used to acquire first unlock information of a current unlock mode; and a transmitting module, configured to transmit the registration command to the smart lock.

In a fifth aspect, the present application provides a smart lock, including respective databases corresponding to N unlock modes, where N is an integer greater than 1; and including: a transceiver, an MCU, a fingerprint identification module, and a memory; where the transceiver is configured to receive a registration command transmitted by a terminal device; the MCU or the fingerprint identification module is configured to acquire first unlock information of a current unlock mode according to the registration command; and the memory is configured to store a database corresponding to the current unlock mode, and the database includes the first unlock information of the current unlock mode.

In a sixth aspect, the present application provides a terminal device communicated with a smart lock, where the smart lock includes respective databases corresponding to N unlock modes, N is an integer greater than 1, and the terminal device includes: a processor and a memory; where the memory is configured to store a computer instruction to cause the processor to perform the data management method for the smart lock as described according to the second aspect or an alternative thereof.

In a seventh aspect, the present application provides a data management system for a smart lock, including: the data management apparatus for the smart lock as described above according to the third aspect or an alternative thereof or the smart lock as described above according to the fifth aspect or an alternative thereof, and the data management apparatus for the smart lock as described above according to the fourth aspect or an alternative thereof or the terminal device as described above according to the sixth aspect or an alternative thereof.

The present application further provides a computer storage medium which includes a computer instruction for implementing the data management method for the smart lock as described above. For content and effects thereof, reference may be made to the method embodiment portion, and details will not be described again.

The present application further provides a computer program product which includes a computer instruction for implementing the data management method for the smart lock as described above. For content and effects thereof, reference may be made to the method embodiment portion, and details will not be described again.

The present application provides a data management method, an apparatus, device, a system, and a storage medium for a smart lock. The smart lock includes respective databases corresponding to N unlock modes, N is an integer greater than 1, and the method includes: receiving a registration command transmitted by a terminal device; acquiring first unlock information of a current unlock mode according to the registration command; and storing the first unlock information of the current unlock mode into a database corresponding to the current unlock mode. Since the smart lock includes a plurality of unlock modes, and each unlock mode corresponds to one database, that is, databases corresponding to the plurality of unlock modes are independent of each other, based on this, for any unlock mode, the smart lock only needs to perform, in a database corresponding to the unlock mode, a process for matching unlock information, so that the unlock efficiency of the smart lock is improved.

BRIEF DESCRIPTION OF DRAWING(S)

In order to illustrate technical solutions in embodiments of the present application or the prior art more clearly, accompanying drawings used in the description of the embodiments or the prior art will be briefly described hereunder. Obviously, the described drawings are merely some embodiments of present application. For persons of ordinary skill in the art, other drawings may be obtained based on these drawings without any creative effort.

DESCRIPTION OF EMBODIMENTS

In order to make objectives, technical solutions, and advantages of embodiments of the present application clearer, the technical solutions in the embodiments of the present application will be described hereunder clearly and comprehensively with reference to the accompanying drawings in the embodiments of the present application. Obviously, the described embodiments are only a part of embodiments of the present application, rather than all embodiments of the present application. All other embodiments obtained by persons of ordinary skill in the art based on the embodiments of the present application without any creative effort shall fall into the scope claimed in the present application.

Terms such as "first", "second", "third", "fourth", etc. (if present) in the specification and the claims as well as the described accompany drawings of the present application are used to distinguish similar objects, but not intended to describe a specific order or sequence. It will be appreciated that the data used in this way may be interchangeable under appropriate circumstances, such that the embodiments of the present application described herein can be implemented in an order other than those illustrated or described herein, for instance. Moreover, terms such as "include" and "have" and any variation thereof are intended to cover a non-exclusive inclusion, e.g., processes, methods, systems, products or devices that encompass a series of steps or units are not necessarily limited to those steps or units that are clearly listed, but may include other steps or units that are not explicitly listed or inherent to these processes, methods, products or devices.

As described above, the unlock modes such as the unlock mode based on NFC, the digital password unlock mode, the fingerprint password unlock mode and the like correspond to the same database. Based on this, for any of the above unlock modes, the smart lock is performing, in the database, a process for matching unlock information, and since there is a large amount of data in the database, a problem of low unlock efficiency is incurred for the smart lock.

Figure 1:
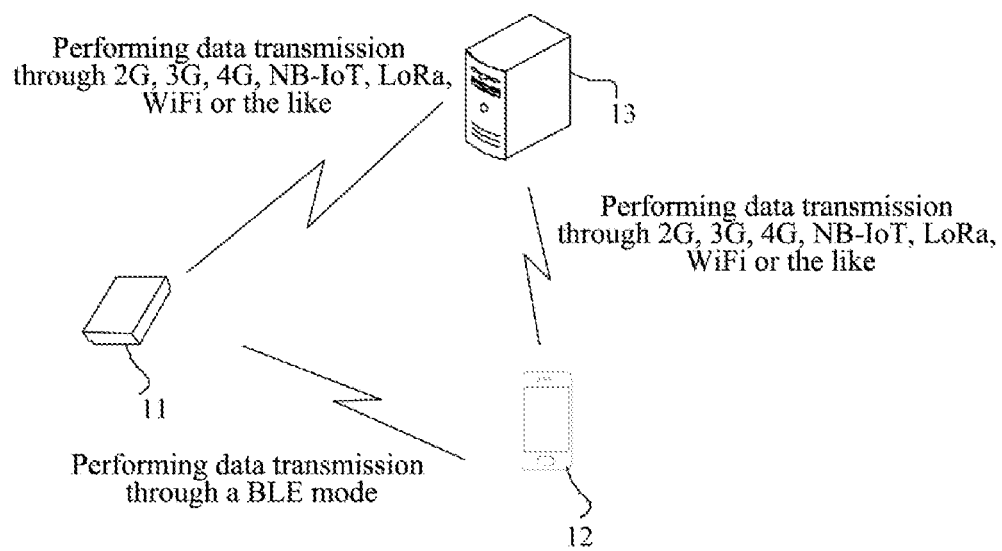
FIG. 1 is a schematic diagram illustrating an application scenario of a technical solution of the present application according to an embodiment of the present application.

In order to solve the above technical problem, the present application provides a data management method, an apparatus, a device, a system, and a storage medium. FIG. 1 is a schematic diagram illustrating an application scenario of a technical solution of the present application according to an embodiment of the present application. As shown in FIG. 1, a smart lock 11 may communicate with a terminal device 12 through a Bluetooth mode (Bluetooth Low Energy, BLE), a $2^{nd}$ Generation (2G) mobile communication mode, a $3^{rd}$ Generation (3G) mobile communication mode, a $4^{th}$ generation (4G) mobile communication mode, a cellular-based Narrow Band Internet of Things (NB-IoT) communication mode, a LoRa technology or Wireless-Fidelity (WiFi), etc. When the smart lock 11 communicates with the terminal device 12 through communication modes such as 2G, 3G, 4G, NB-IoT, LoRa, WiFi or the like, a server 13 functions as an intermediate network element between the smart lock 11 and the terminal device 12 to implement data storage and forwarding between the smart lock 11 and the terminal device 12. Among others, the smart lock 11 has various unlock modes, such as an unlock mode based on NFC, a digital password unlock mode, a fingerprint password unlock mode, and the like.

It should be noted that the terminal device involved in the present application may be a device that provides a user with voice and/or data connectivity, a handheld device with a wireless connection function, or other processing device connected to a wireless modem. The terminal device may communicate with at least one core network via a Radio Access Network (RAN). The terminal device may be a mobile terminal such as a mobile phone (or known as a "cellular" phone) and a computer with a mobile terminal, for example, portable, pocket, handheld, computer built-in or vehicle-mounted mobile devices that exchange voice and/or data with the radio access network. The terminal device may also be known as a Subscriber Unit, a Subscriber Station, a Mobile Station, a Mobile platform, a Remote Station, an Access Point, a remote terminal, an access terminal, a user terminal, a user agent, or a user equipment, which is not limited herein.

The technical solutions of the present application will be described hereunder in detail for the above-described application scenario.

Figure 2:
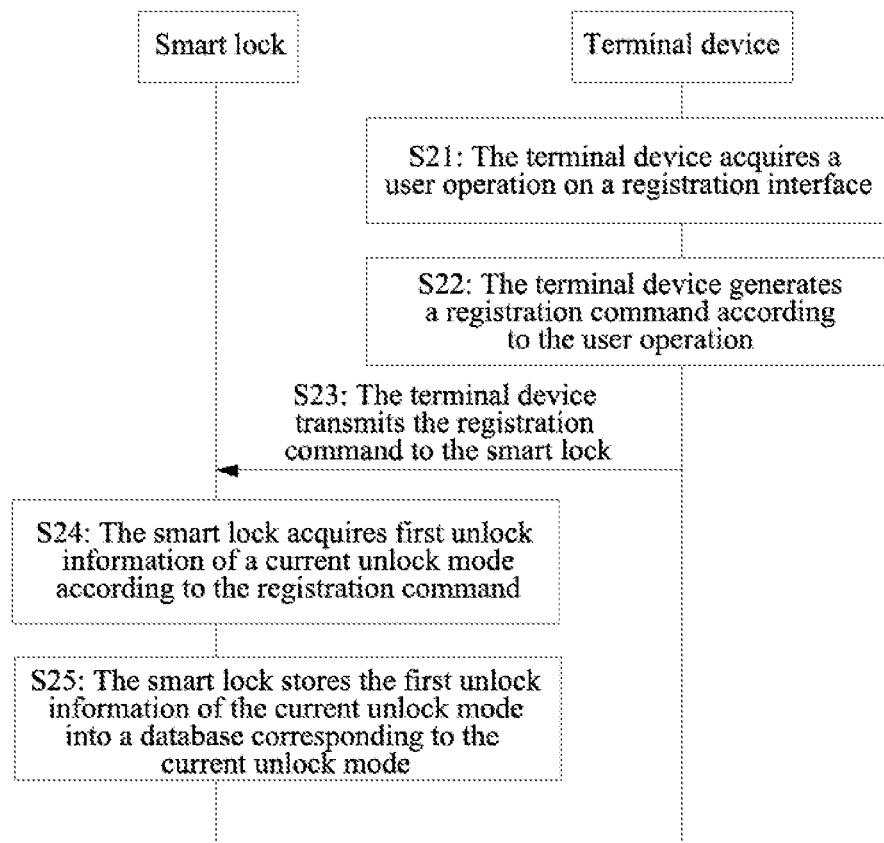
FIG. 2 is an interaction flowchart of a data management method for a smart lock according to an embodiment of the present application.

FIG. 2 is an interaction flowchart of a data management method for a smart lock according to an embodiment of the present application. A network element involved in the method includes: part or integrity of a smart lock (in a possible design, part of the smart lock may be an MCU and/or a fingerprint identification module in the smart lock), and part or integrity of a terminal device (in a possible design, part of the terminal device may be a processor in the terminal device); for the sake of convenience, the method is illustrated hereunder by using an example where the network element involved in the method includes the smart lock and the terminal device. The described smart lock includes: respective databases corresponding to N unlock modes, where N is an integer greater than 1. As shown in FIG. 2, the method includes the following steps:

Step S21: The terminal device acquires a user operation on a registration interface.

Step S22: The terminal device generates a registration command according to the user operation.

Step S23: The terminal device transmits the registration command to the smart lock.

Step S24: The smart lock acquires first unlock information of a current unlock mode according to the registration command.

Step S25: The smart lock stores the first unlock information of the current unlock mode into a database corresponding to the current unlock mode.

In the present application, data management is performed on the smart lock mainly through the terminal device. Therefore, prior to Step S21, a binding relationship among the smart lock, the server and the terminal device needs to be established first. Specifically, the user first installs a smart lock application (APP) on the terminal device, and registers a cloud account on the APP; after the cloud account is successfully registered, the user logs in to a cloud service, and then the user may enter a master interface of the smart lock APP. The user may enter information of the smart lock into a device add field of the master interface, such as an identifier of the smart lock. Alternatively, the user may scan a QR code of the smart lock. After the user enters the information of the smart lock successfully, or after the user scans the QR code of the smart lock, the user may enter a cloud address of the server and an access key corresponding to the smart lock on a current interface of the APP (the interface may be the described master interface or an interface subsequent to the master interface). After the cloud address of the server and the access key corresponding to the smart lock are entered successfully, the smart lock then has accessed to the server, and the smart lock may transmit an identifier thereof to the terminal device through the server. In addition, through a Bluetooth mode, the terminal device may acquire an identifier of the smart lock from the smart lock. The terminal device may compare the identifiers of the smart lock that are acquired through the two modes; if the comparison is successful, it indicates that the terminal device, the smart lock, and the server are successfully bound.

After the terminal device, the smart lock, and the server are successfully bound, the user may register the unlock information of the smart lock through the terminal device, where description in Step S21-Step S25 refers to a registration process of the unlock information.

Figure 3:
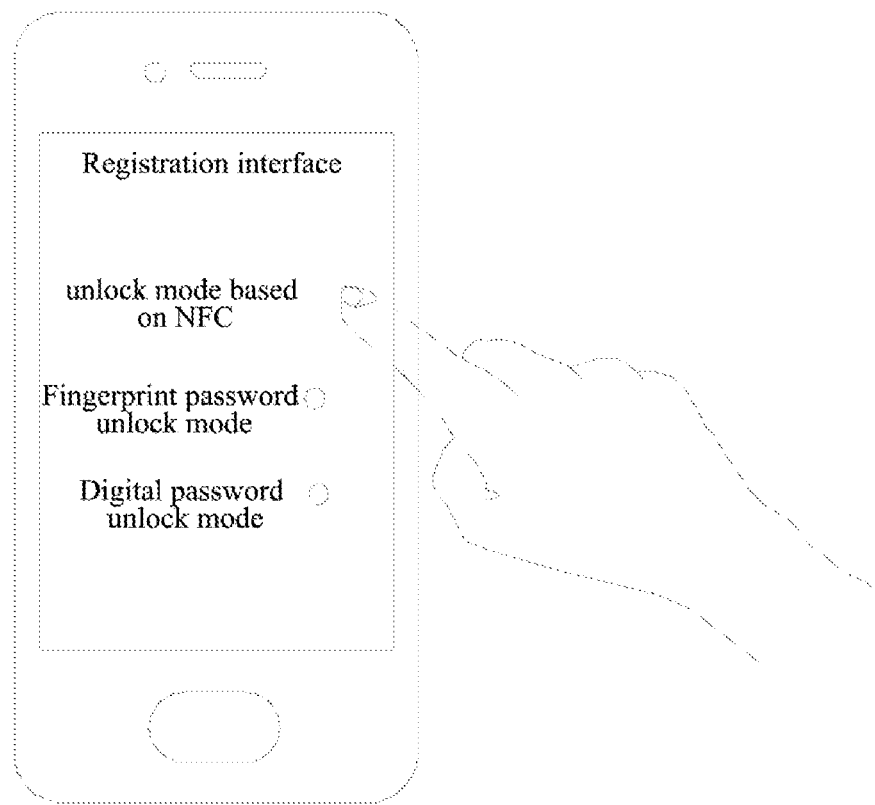
FIG. 3 is a schematic diagram illustrating a registration interface of a terminal device according to an embodiment of the present application.

Illustration is made with regard to Step S21-Step S25:

FIG. 3 is a schematic diagram illustrating a registration interface of a terminal device according to an embodiment of the present application. As shown in FIG. 3, in a possible design, the registration interface includes the following information: an unlock mode based on NFC, a digital password unlock mode, and a fingerprint password unlock mode.

When the user clicks the unlock mode based on NFC, the terminal device generates a registration command, and transmits the registration command to the smart lock through Bluetooth, 2G, 3G, 4G, NB-IoT, LoRa, WiFi or the like; based on this, the smart lock may push a prompt message to prompt the user to perform a swipe operation using an NFC access card, at this point, the smart lock may read unlock information of the NFC unlock mode, such as an NFC number of the NFC access card, and store the unlock information of the unlock mode to a database corresponding to the unlock mode based on NFC. Among others, the smart lock may push the prompt message through a warning light or broadcast the prompt message over voice, which is not limited in the present application.

When the user clicks the fingerprint password unlock mode, the terminal device generates a registration command, and transmits the registration command to the smart lock through Bluetooth, 2G, 3G, 4G, NB-IoT, LoRa, WiFi or the like; based on this, the smart lock may push a prompt message to prompt the user to input a fingerprint. After the user inputs the fingerprint, the smart lock may read unlock information of the unlock mode based on fingerprint password, and store the unlock information of the unlock mode into a database corresponding to the fingerprint password unlock mode. Among others, the smart lock may push the prompt message through a warning light or broadcast the prompt message over voice, which is not limited in the present application.

When the user clicks the digital password unlock mode, in a possible design, the terminal device generates a registration command, and transmits the registration command to the smart lock through Bluetooth, 2G, 3G, 4G, NB-IoT, LoRa, WiFi or the like; based on this, the smart lock may push a prompt message to prompt the user to input a digital password. After the user inputs the digital password, the smart lock may read unlock information of the unlock mode based on digital password, and store the unlock information of the unlock mode into a database corresponding to the digital password unlock mode. Among others, the smart lock may push the prompt message through a warning light or broadcast the prompt message over voice, which is not limited in the present application. In another possible design, when the user clicks the digital password unlock mode, the terminal device then displays a numeric keypad, while the user inputs a digital password and generates a registration command, where the registration command includes the digital password, moreover, the registration command is transmitted to the smart lock through Bluetooth, 2G, 3G, 4G, NB-IoT, LoRa, WiFi or the like; the smart lock may read the digital password, that is, unlock information of the unlock mode based on digital password, and store the unlock information of the unlock mode into a database corresponding to the digital password unlock mode.

In a possible design, the database corresponding to the unlock mode based on NFC and the database corresponding to the digital password unlock mode may be stored in a storage unit of the MCU, and the database corresponding to the fingerprint password unlock mode may be stored in a storage unit of the fingerprint identification module, for example, stored in a flash memory (FLASH) of the fingerprint identification module.

In a possible design, subsequent to Step S25, the smart lock transmits the first unlock information of the current unlock mode to the terminal device, so that the user queries the first unlock information at the terminal device.

In a possible design, subsequent to Step S25, the smart lock transmits the first unlock information of the current unlock mode to the server, and the server stores the first unlock information of the current unlock mode to the local.

The embodiment of the present application provides a data management method for a smart clock, where the smart lock includes a plurality of unlock modes, and each unlock mode corresponds to one database, that is, databases corresponding to the plurality of unlock modes are independent of each other, based on this, for any unlock mode, the smart lock only needs to perform, in a database corresponding to the unlock mode, a process for matching unlock information, so that the unlock efficiency of the smart lock is improved. Further, in the embodiment of the present application, a binding relationship is established among the terminal device, the smart lock, and the server, based on this, a user may implement registration of unlock information simply through the terminal device, and thus the user experience is improved.

Figure 4:
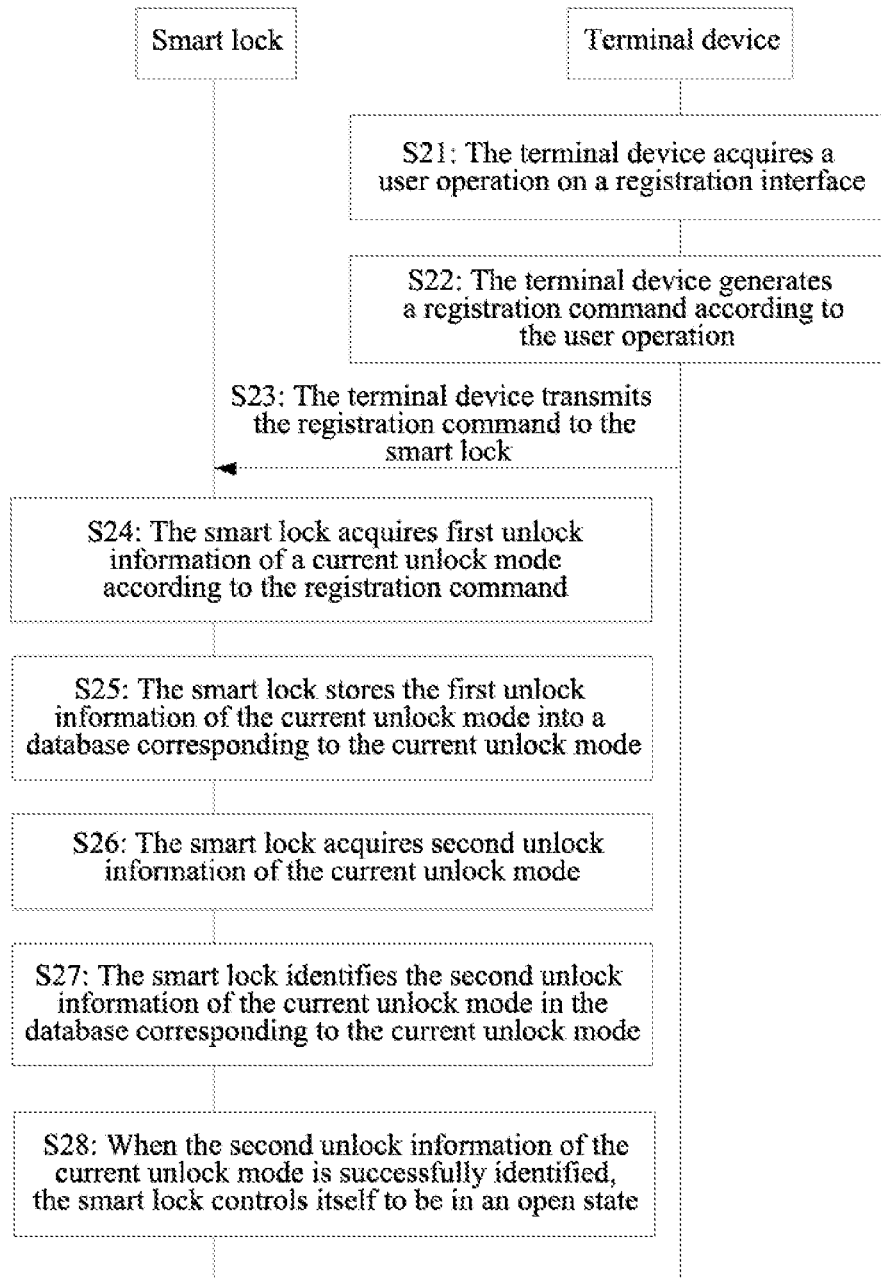
FIG. 4 is an interaction flowchart of a data management method for a smart lock according to another embodiment of the present application.

The previous embodiment mainly introduces the registration process of the unlock information, and a matching or identification process of the unlock information will be described hereunder. Specifically, FIG. 4 is an interaction flowchart of a data management method for a smart lock according to another embodiment of the present application. A network element involved in the method includes: part or integrity of a smart lock (in a possible design, part of the smart lock may be an MCU and/or a fingerprint identification module in the smart lock), and part or integrity of a terminal device (in a possible design, part of the terminal device may be a processor in the terminal device); for the sake of convenience, the method is illustrated hereunder by using an example where the network element involved in the method includes the smart lock and the terminal device. As shown in FIG. 4, the method further includes the following steps subsequent to Step S25 described above:

Step S26: The smart lock acquires second unlock information of the current unlock mode.

Step S27: The smart lock identifies the second unlock information of the current unlock mode in the database corresponding to the current unlock mode.

Step S28: When the second unlock information of the current unlock mode is successfully identified, the smart lock controls itself to be in an open state.

Among others, the first unlock information of the current unlock mode is unlock information of the unlock mode involved in the registration process, and the second unlock information of the current unlock mode is unlock information of the unlock mode stored in a corresponding database. The first unlock information and the second unlock information of the current unlock mode may be the same or may be different. When the first unlock information and the second unlock information of the current unlock mode are the same, it indicates that the smart lock successfully identifies the second unlock information of the current unlock mode, and then the MCU in the smart lock controls an actuator to actuate the smart lock to be in an open state. When the first unlock information and the second unlock information of the current unlock mode are different, it indicates that the smart lock fails to identify the second unlock information of the current unlock mode, and then the MCU in the smart lock does not control an actuator to actuate the smart lock to be in an open state.

In a possible design, the database corresponding to the unlock mode based on NFC and the database corresponding to the digital password unlock mode may be stored in a storage unit of the MCU, and the database corresponding to the fingerprint password unlock mode may be stored in a storage unit of the fingerprint identification module, for example, stored in a flash memory (FLASH) of the fingerprint identification module. Therefore, in an offline mode, the smart lock may read unlock information based on NFC or a digital password from the storage unit of the MCU, and may also read a fingerprint password from the flash memory (FLASH) of the fingerprint identification module.

The embodiment of the present application provides a data management method for a smart lock, where the smart lock includes a plurality of unlock modes, and each unlock mode corresponds to one database, that is, databases corresponding to the plurality of unlock modes are independent of each other, based on this, the smart lock acquires second unlock information of the current unlock mode. The smart lock identifies the second unlock information of the current unlock mode in a database corresponding to the current unlock mode. When the second unlock information of the current unlock mode is successfully identified, the smart lock controls itself to be in an open state, so that the unlock efficiency of the smart lock is improved.

Figure 5:
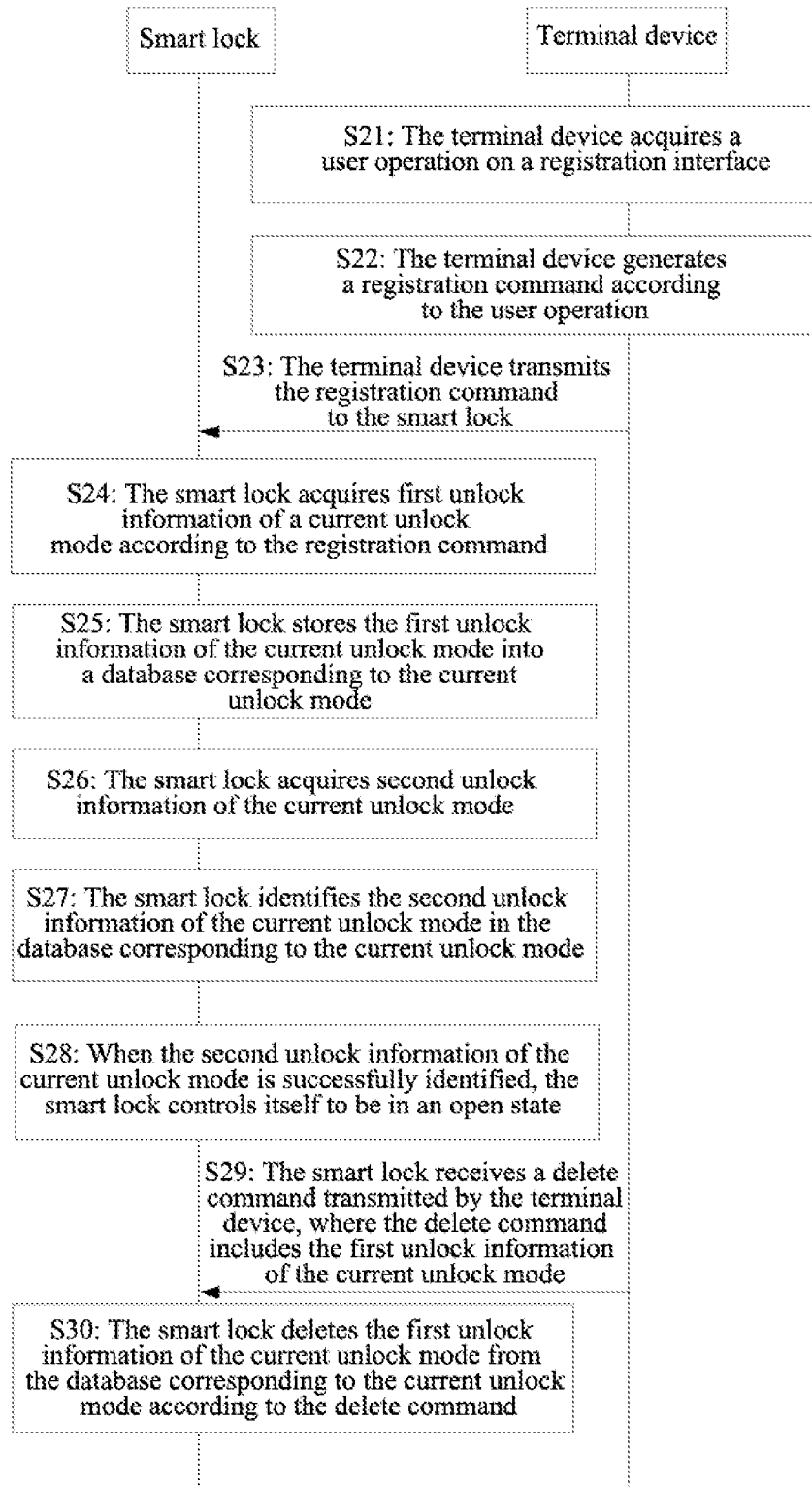
FIG. 5 is an interaction flowchart of a data management method for a smart lock according to still another embodiment of the present application.

Based on any of the above embodiments, further, a deleting process of the unlock information will be described hereunder. Specifically, FIG. 5 is an interaction flowchart of a data management method for a smart lock according to still another embodiment of the present application. A network element involved in the method includes: part or integrity of a smart lock (in a possible design, part of the smart lock may be an MCU and/or a fingerprint identification module in the smart lock), and part or integrity of a terminal device (in a possible design, part of the terminal device may be a processor in the terminal device); for the sake of convenience, the method is illustrated hereunder by using an example where the network element involved in the method includes the smart lock and the terminal device. As shown in FIG. 5, the method is illustrated by using an example where the method is implemented subsequent to Step S28 described above. The method further includes the following steps:

Step S29: The smart lock receives a delete command transmitted by the terminal device, where the delete command includes the first unlock information of the current unlock mode.

Step S30: The smart lock deletes the first unlock information of the current unlock mode from the database corresponding to the current unlock mode according to the delete command.

Assuming that the current unlock mode is the unlock mode based on NFC, when the smart lock receives a delete command, the smart lock deletes unlock information based on NFC from the storage unit of the MCU. Assuming that the current unlock mode is the digital password unlock mode, when the smart lock receives a delete command, the smart lock deletes, from the storage unit of the MCU, a digital password carried in the delete command. Assuming that the current unlock mode is the fingerprint password unlock mode, when the smart lock receives a delete command, the smart lock deletes, from the storage unit of the fingerprint identification module, a fingerprint password carried in the delete command.

It should be noted that, for a one-time password, such as a password temporarily set by the user through the terminal device for other user, after the smart lock completes a process of identifying the password, in a possible design, as described in Step S29 and Step S30: after the smart lock receives a delete command for the password, the smart lock deletes the password from the local. In another possible design, when registering such one-time password, the terminal device generates an identifier to identify the password as a one-time password. Based on this, the unlock information stored by the smart lock at this time includes: the one-time password and the identifier corresponding to the one-time password. Based on this, after the smart lock completes identification of the one-time password, the one-time password and the corresponding identifier can be directly deleted from the local without acquiring the delete command from the terminal device.

The embodiment of the present application provides a data management method for a smart lock, including: the smart lock receives a delete command transmitted by the terminal device, where the delete command includes the first unlock information of the current unlock mode. The smart lock deletes the first unlock information of the current unlock mode from the database corresponding to the current unlock mode according to the delete command, so that management of the smart lock by the user through the terminal device is implemented, thereby improving user experience.

Figure 6:
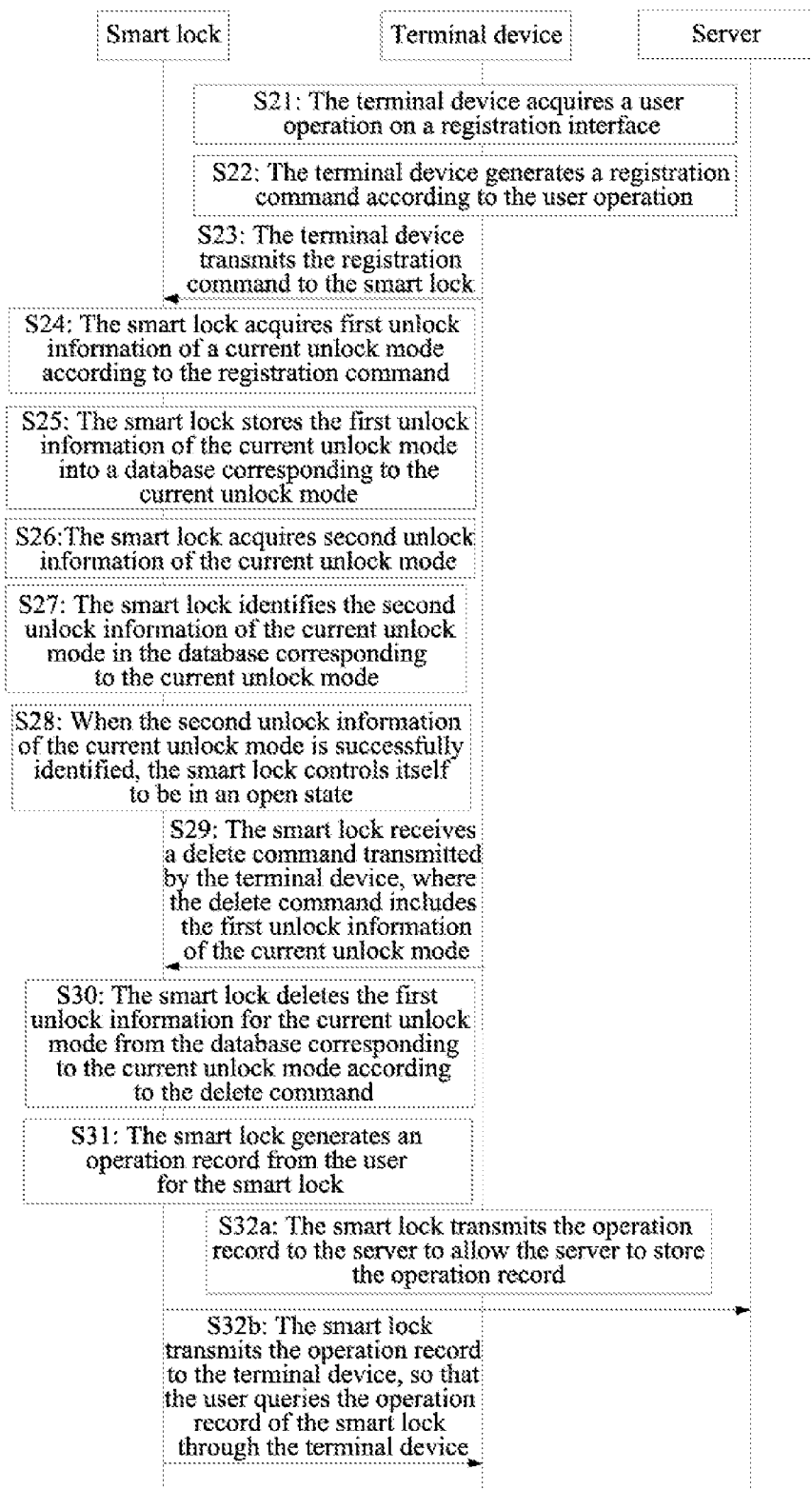
FIG. 6 is an interaction flowchart of a data management method for a smart lock according to still another embodiment of the present application.

In a possible design, subsequent to Step S25 or Step S28 or Step S30, the smart lock may also transmit an operation record from the user for the smart lock to the server or the terminal device. For example, FIG. 6 is an interaction flowchart of a data management method for a smart lock according to still another embodiment of the present application. The method is illustrated by using an example where the method is implemented subsequent to Step S30 described above. The method further includes the following steps:

Step S31: The smart lock generates an operation record from the user for the smart lock.

Step S32a: The smart lock transmits the operation record to the server to allow the server to store the operation record. Or, Step S32b: The smart lock transmits the operation record to the terminal device, so that the user queries the operation record of the smart lock through the terminal device.

Among others, the operation record described above includes at least one of: an operation record from the user in the above registration process, an operation record from the user in the above identification process, and an operation record from the user in the above deleting process.

After the smart lock transmits the operation record to the server, the server may store the operation record to the local, so that the user, after logging in to a cloud account, may acquire the operation record from the server. After the smart lock transmits the operation record to the terminal device, the user may query the operation record for the smart lock on the terminal device. Among others, in addition to displaying the operation record of the smart lock, the terminal device may also play the operation record of the smart lock over voice.

In a possible design, the smart lock communicates with the terminal device through a Bluetooth mode, correspondingly, the smart lock may transmit the operation record to the terminal device through the Bluetooth mode; or the smart lock communicates with the terminal device through 2G, 3G, 4G, NB-IoT, LoRa or WiFi, and the smart lock may transmit the operation record to the server through the 2G, 3G, 4G, NB-IoT, LoRa or WiFi, so that the server forwards the operation record to the terminal device through the 2G, 3G, 4G, NB-IoT, LoRa or WiFi.

In a possible design, when the smart lock communicates with the terminal device through the Bluetooth mode, an application layer protocol used by the smart lock and the terminal device is a Constrained Application Protocol (COAP). Further, in order to improve reliability of data transmission, data between the smart lock and the terminal device may be encrypted by using a Transport Layer Security (TLS) protocol.

When the smart lock communicates with the terminal device through the 2G, 3G, 4G, NB-IoT, LoRa or WiFi, an application layer protocol used by the smart lock and the server is a COAP or a Message Queuing Telemetry Transport (MQTT) protocol. Further, in order to improve reliability of data transmission, data between the smart lock and the server may be encrypted by using TLS. The server and the terminal device use a Hypertext Transfer Protocol Secure (HTTPS) and a TCP-based full-duplex communication protocol (websocket) on a wide area network to ensure reliability of data between the server and the terminal device.

In a possible design, when the smart lock communicates with the terminal device through the Bluetooth mode, a data packet transmitted between the smart lock and the terminal device successively includes: a preamble of data to be transmitted, a length field of the data to be transmitted, the data to be transmitted, and a Cyclic Redundancy Check (CRC) calculated according to the length field of the data to be transmitted and the data to be transmitted.

Among others, the data to be transmitted may be the registration command, the delete command, the operation record or the like described above. The preamble of the data to be transmitted is used to uniquely identify the data to be transmitted, and the preamble of the data to be transmitted may have a length of 2 bytes. The length field of the data to be transmitted may also occupy 2 bytes. The above-described CRC is a CRC calculated by the smart lock or the terminal device from the start of the length field of the data to be transmitted to the end of the field of the data to be transmitted. The calculation method of this CRC is a CRC calculation method in the prior art, which will not be described in this application again.

The embodiment of the present application provides a data management method for a smart lock, including: the smart lock generates an operation record from the user for the smart lock. The smart lock transmits the operation record to the server to allow the server to store the operation record. Alternatively, the smart lock transmits the operation record to the terminal device so that the user queries the operation record for the smart lock through the terminal device. Therefore, the server or the terminal device is allowed to acquire, in real time, the operation record from the user for the smart lock, thereby improving user experience.

Figure 7A:
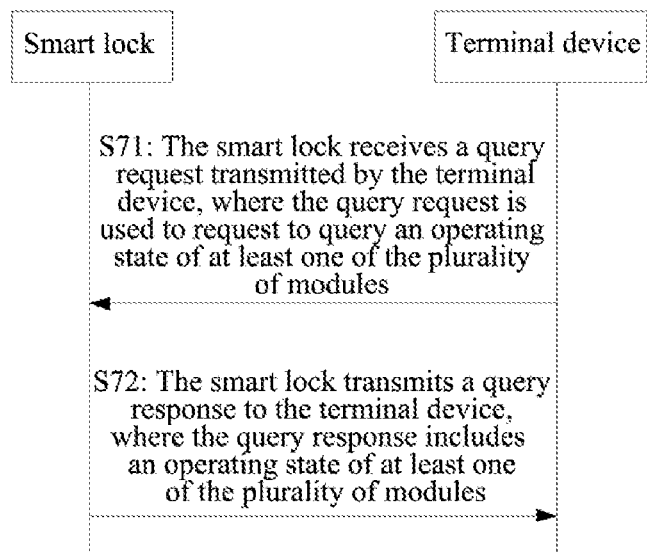
FIG. 7A is an interaction flowchart illustrating a data management method for a smart lock according to still another embodiment of the present application.

On the basis of any of the above embodiments, further, the smart lock described above includes a plurality of modules. Correspondingly, FIG. 7A is an interaction flowchart illustrating a data management method for a smart lock according to still another embodiment of the present application. The method includes the following steps:

Step S71: The smart lock receives a query request transmitted by the terminal device, where the query request is used to request to query an operating state of at least one of the plurality of modules.

Step S72: The smart lock transmits a query response to the terminal device, where the query response includes an operating state of at least one of the plurality of modules.

Among others, any one of the plurality of modules may be a software module or a hardware module in the smart lock. For example, the plurality of modules may include: a transceiver, an MCU, a fingerprint identification module, a memory, a motor, a keypad, an NFC module, and the like.

In a possible design, the query request includes: an identifier of a module to be queried among the plurality of modules, such as an identifier of the MCU. After the smart lock receives the query request, the smart lock acquires an identifier carried in the query request for the module to be queried, and queries an operating state of the module to be queried, for example, currently in a normal operating state, a fault state, an idle state or the like. The smart lock carries the operating state of the module to be queried in a query response, and transmit the query response to the terminal device, so that the user queries, through the terminal device, the operating state of the module to be queried.

Figure 7B:
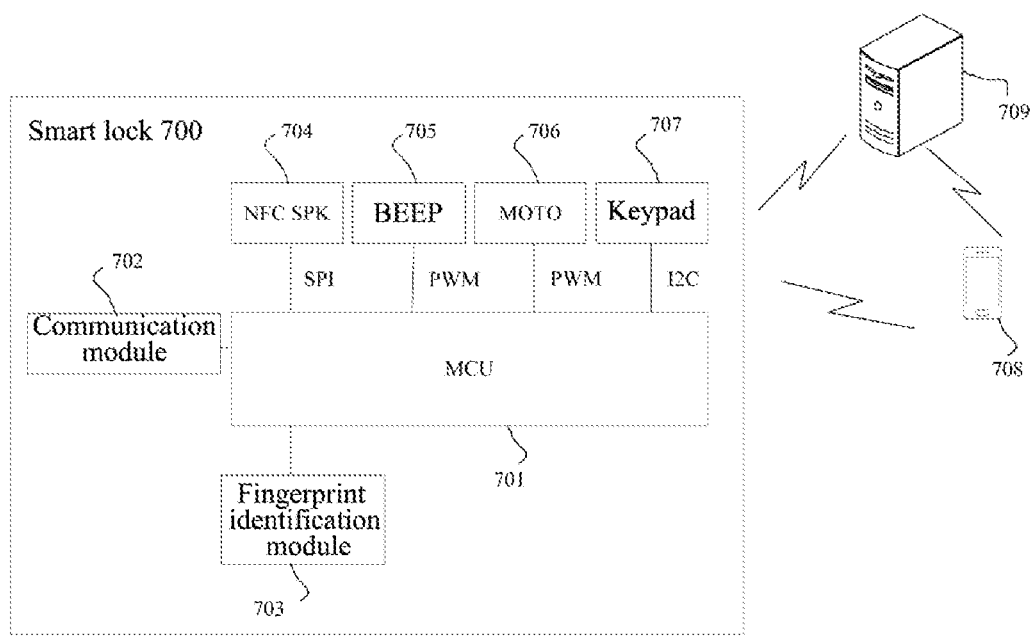
FIG. 7B is a schematic diagram illustrating that a user queries, through a terminal device, an operating state of a module to be queried according to an embodiment of the present application.

For example, FIG. 7B is a schematic diagram illustrating that a user queries, through a terminal device, an operating state of a module to be queried according to an embodiment of the present application. As shown in FIG. 7B, the smart lock 700 includes: an MCU 701, a communication module 702 (which may be a communication module over Internet of Things), a fingerprint identification module 703, a Near Field Communication Speaker (NFC SPK) 704, a beep (BEEP) 705, a motor (MOTO) 706, and a peripheral module such as a keypad (KEY) 707. Among others, the terminal device 708 may acquire, through a server 709 in the cloud, an operating state of the module to be queried, or acquire, directly through the Bluetooth mode, an operating state of the module to be queried.

In a possible design, the MCU 701 has a Bluetooth function.

The NFC SPK 704 described above performs data transmission with the MCU 701 through a Serial Peripheral Interface (SPI). The BEEP 705 and the MOTO 706 described above perform data transmission with the MCU 701 through Pulse Width Modulation (PWM). The KEY 707 described above performs data transmission with the MCU 701 through a bus (Inter-Integrated Circuit, I2C).

The embodiment of the present application provides a data management method for a smart lock, including: the smart lock receives a query request transmitted by the terminal device. The smart lock transmits a query response to the terminal device, where the query response includes an operating state of at least one of the plurality of modules, so that the user may query, in real time, the operating state of the module to be queried, and thus it is possible to improve user experience.

Figure 8:
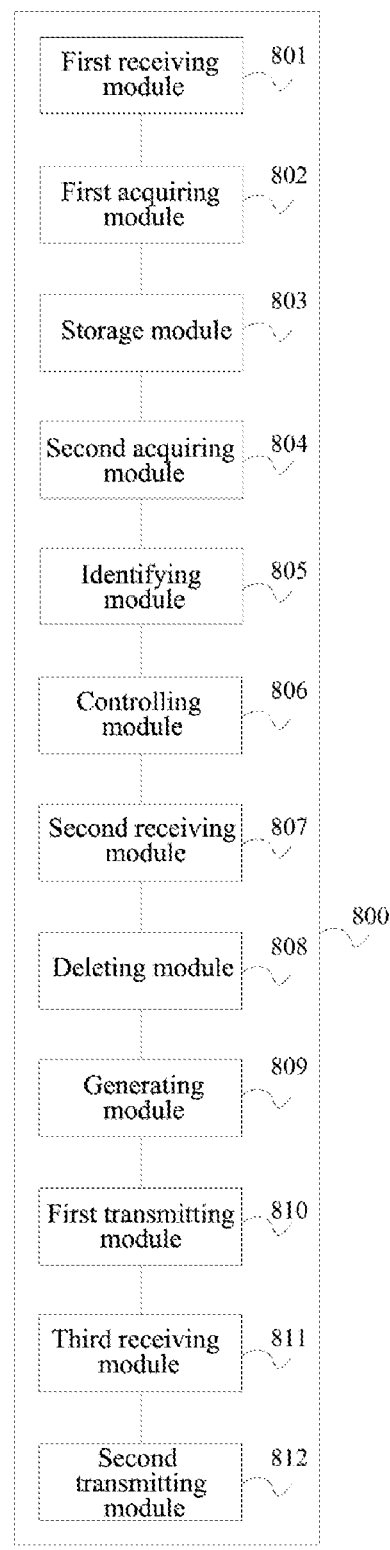
FIG. 8 is a schematic diagram illustrating a data management apparatus 800 for a smart lock according to an embodiment of the present application.

FIG. 8 is a schematic diagram illustrating a data management apparatus 800 for a smart lock according to an embodiment of the present application. Among others, the data management apparatus 800 may be part or integrity of the smart lock, and the smart lock includes respective databases corresponding to N unlock modes, where N is an integer greater than 1. As shown in FIG. 8, the data management apparatus 800 includes:

a first receiving module 801, configured to receive a registration command transmitted by a terminal device;

a first acquiring module 802, configured to acquire first unlock information of a current unlock mode according to the registration command; and a storage module 803, configured to store the first unlock information of the current unlock mode into a database corresponding to the current unlock mode.

In a possible design, the data management apparatus 800 further includes:

a second acquiring module 804, configured to acquire second unlock information of the current unlock mode;

an identifying module 805, configured to identify the second unlock information of the current unlock mode in the database corresponding to the current unlock mode; and a controlling module 806, configured to control the smart lock to be in an open state when the second unlock information of the current unlock mode is successfully identified.

In a possible design, the data management apparatus 800 further includes:

a second receiving module 807, configured to receive a delete command transmitted by the terminal device, where the delete command includes the first unlock information of the current unlock mode; and a deleting module 808, configured to delete the first unlock information of the current unlock mode from the database corresponding to the current unlock mode according to the delete command.

In a possible design, the data management apparatus 800 further includes:

a generating module 809, configured to generate an operation record from a user for the smart lock; and a first transmitting module 810, configured to transmit the operation record to a server to allow the server to store the operation record, or transmit the operation record to the terminal device so that the user queries the operation record of the smart lock through the terminal device.

In a possible design, the first transmitting module 810 is specifically configured to transmit the operation record to the terminal device through the Bluetooth mode; or, the first transmitting module 810 is specifically configured to transmit the operation record to the server through 2G, 3G, 4G, NB-IoT, LoRa or WiFi, so that the server forwards the operation record to the terminal device through the 2G, 3G, 4G, NB-IoT, LoRa or WiFi.

In a possible design, when the smart lock communicates with the terminal device through the Bluetooth mode, an application layer protocol used by the smart lock and the terminal device is a constrained application protocol COAP; when the smart lock communicates with the terminal device through the 2G, 3G, 4G, NB-IoT, LoRa or WiFi, an application layer protocol used by the smart lock and the server is a COAP or a message queuing telemetry transport MQTT protocol.

In a possible design, when the smart lock communicates with the terminal device through the Bluetooth mode, a data packet transmitted between the smart lock and the terminal device successively includes: a preamble of data to be transmitted, a length field of the data to be transmitted, the data to be transmitted, and a cyclic redundancy check CRC calculated according to the length field of the data to be transmitted and the data to be transmitted.

In a possible design, the smart lock includes a plurality of modules which may be software or functional modules such as the first acquiring module and the first transmitting module described above, or may be hardware modules such as the MCU, the fingerprint identification module, and the transceiver; correspondingly, in a possible design, the data management apparatus 800 further includes:
  a third receiving module 811, configured to receive a query request transmitted by the terminal device, where the query request is used to request to query an operating state of at least one of the plurality of modules; and
  a second transmitting module 812, configured to transmit a query response to the terminal device, where the query response includes an operating state of at least one of the plurality of modules.

In a possible design, the N unlock modes include at least two of the following: an unlock mode based on near field communication NFC, a digital password unlock mode, and a fingerprint unlock mode.

The data management apparatus for the smart lock provided in the embodiment of the present application can be used to perform the data management method implemented on the side of the smart lock described above. For content and effects thereof, reference may be made to the method embodiment portion, and details will not be described again.

Figure 9:
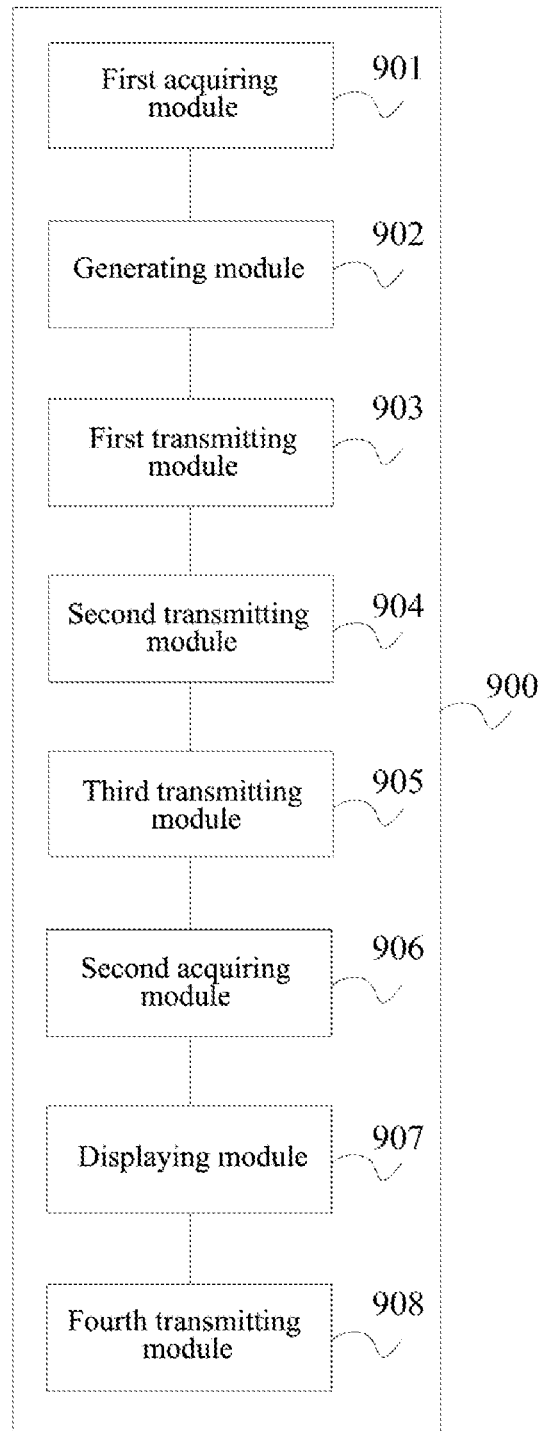
FIG. 9 is a schematic diagram illustrating a data management apparatus 900 for a smart lock according to an embodiment of the present application.

FIG. 9 is a schematic diagram illustrating a data management apparatus 900 for a smart lock according to an embodiment of the present application. Among others, the data management apparatus 900 may be part or integrity of the terminal device, and the smart lock includes respective databases corresponding to N unlock modes, where N is an integer greater than 1. As shown in FIG. 9, the data management apparatus 900 includes:
  a first acquiring module 901, configured to acquire a user operation on a registration interface;
  a generating module 902, configured to generate a registration command according to the user operation, where the registration command is used to acquire first unlock information of a current unlock mode; and
  a first transmitting module 903, configured to transmit the registration command to the smart lock.

In a possible design, the data management apparatus 900 further includes:
  a second transmitting module 904, configured to transmit second unlock information of the current unlock mode to the smart lock, where the second unlock information of the current unlock mode is used to determine whether to control the smart lock to be in an open state.

In a possible design, the data management apparatus 900 further includes:
  a third transmitting module 905, configured to transmit a delete command to the smart lock, where the delete command includes the first unlock information of the current unlock mode.

In a possible design, the data management apparatus 900 further includes:
  a second acquiring module 906, configured to acquire an operation record of the smart lock; and
  a displaying module 907, configured to display the operation record of the smart lock so that the user queries the operation record of the smart lock.

In a possible design, the smart lock communicates with the terminal device through a Bluetooth mode, correspondingly, the second acquiring module 906 is specifically configured to receive, through the Bluetooth mode, the operation record transmitted by the smart lock. Or, the smart lock communicates with the terminal device through 2G, 3G, 4G, NB-IoT, LoRa or WiFi, correspondingly, the second acquiring module 906 is specifically configured to receive, through the 2G, 3G, 4G, NB-IoT, LoRa or WiFi, the operation record forwarded by a server.

In a possible design, when the smart lock communicates with the terminal device through the Bluetooth mode, an application layer protocol used by the smart lock and the terminal device is a COAP; when the smart lock communicates with the terminal device through the 2G, 3G, 4G, NB-IoT, LoRa or WiFi, an application layer protocol used by the smart lock and the server is a COAP or an MQTT protocol.

In a possible design, when the smart lock communicates with the terminal device through the Bluetooth mode, a data packet transmitted between the smart lock and the terminal device successively includes: a preamble of data to be transmitted, a length field of the data to be transmitted, the data to be transmitted, and a CRC calculated according to the length field of the data to be transmitted and the data to be transmitted.

In a possible design, the smart lock includes a plurality of modules; correspondingly, the data management apparatus 900 further includes:
  a fourth transmitting module 908, configured to transmit a query request to the smart lock, where the query request is used to request to query an operating state of at least one of the plurality of modules; and
  a receiving module, configured to receive a query response transmitted by the terminal device, where the query response includes an operating state of at least one of the plurality of modules.

In a possible design, the N unlock modes include at least two of the following: an unlock mode based on NFC, a digital password unlock mode, and a fingerprint unlock mode.

The data management apparatus for the smart lock provided in the embodiment of the present application can be used to perform the data management method implemented on the side of the terminal device described above. For content and effects thereof, reference may be made to the method embodiment portion, and details will not be described again.

Figure 10:
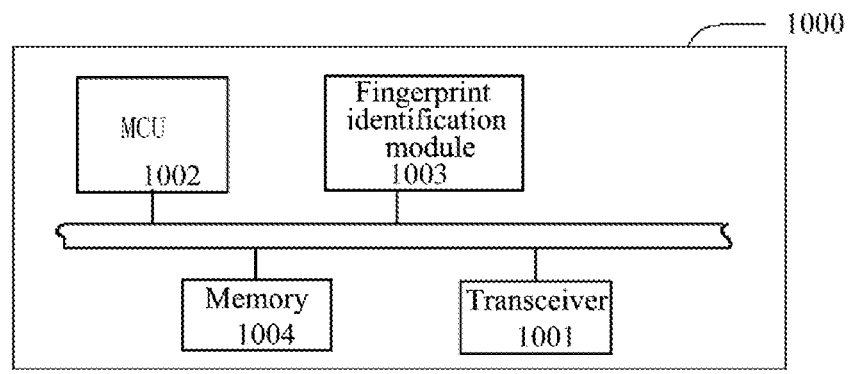
FIG. 10 is a schematic diagram illustrating a smart lock 1000 according to an embodiment of the present application.

FIG. 10 is a schematic diagram illustrating a smart lock 1000 according to an embodiment of the present application. The smart lock 1000 includes respective databases corresponding to N unlock modes, where N is an integer greater than 1; and includes: a transceiver 1001, an MCU 1002, a fingerprint identification module 1003, and a plurality of memories 1004 including a memory (which may be integrated on the fingerprint identification module 1003) for storing corresponding information of the fingerprint identification module 1003 and a memory (which may be integrated on the MCU 1002) for storing corresponding information of the MCU 1002.

The transceiver 1001 is configured to receive a registration command transmitted by a terminal device.

The MCU 1002 or the fingerprint identification module 1003 is configured to acquire first unlock information of a current unlock mode according to the registration command.

The memory 1004 is configured to store a database corresponding to the current unlock mode, and the database includes the first unlock information of the current unlock mode.

In a possible design, the MCU 1002 or the fingerprint identification module 1003 is further configured to: acquire second unlock information of the current unlock mode; identify the second unlock information of the current unlock mode in the database corresponding to the current unlock mode; and control the smart lock to be in an open state when the second unlock information of the current unlock mode is successfully identified.

In a possible design, the transceiver 1001 is further configured to receive a delete command transmitted by the terminal device, where the delete command includes the first unlock information of the current unlock mode.

The MCU 1002 or the fingerprint identification module 1003 is further configured to delete the first unlock information of the current unlock mode from the database corresponding to the current unlock mode according to the delete command.

In a possible design, the MCU 1002 or the fingerprint identification module 1003 is further configured to generate an operation record from a user for the smart lock.

The transceiver 1001 is further configured to: transmit the operation record to a server to allow the server to store the operation record, or transmit the operation record to the terminal device so that the user queries the operation record of the smart lock through the terminal device.

In a possible design, the smart lock communicates with the terminal device through a Bluetooth mode, correspondingly, the transceiver 1001 is specifically configured to: transmit the operation record to the terminal device through the Bluetooth mode;

or, the smart lock communicates with the terminal device through 2G, 3G, 4G, NB-IoT, LoRa or WiFi, correspondingly, the transceiver 1001 is specifically configured to transmit the operation record to the server through the 2G, 3G, 4G, NB-IoT, LoRa or WiFi, so that the server forwards the operation record to the terminal device through the 2G, 3G, 4G or Internet of Things.

In a possible design, when the smart lock communicates with the terminal device through the Bluetooth mode, an application layer protocol used by the smart lock and the terminal device is a COAP; when the smart lock communicates with the terminal device through the 2G, 3G, 4G, NB-IoT, LoRa or WiFi, an application layer protocol used by the smart lock and the server is a COAP or an MQTT protocol.

In a possible design, when the smart lock communicates with the terminal device through the Bluetooth mode, a data packet transmitted between the smart lock and the terminal device successively includes: a preamble of data to be transmitted, a length field of the data to be transmitted, the data to be transmitted, and a CRC calculated according to the length field of the data to be transmitted and the data to be transmitted.

In a possible design, the smart lock includes a plurality of modules including the transceiver 1001, the MCU 1002, the fingerprint identification module 1003 and the memory 1004.

The transceiver 1001 is further configured to receive a query request transmitted by the terminal device, where the query request is used to request to query an operating state of at least one of the plurality of modules.

The transceiver 1001 is further configured to transmit a query response to the terminal device, where the query response includes an operating state of at least one of the plurality of modules.

In a possible design, the N unlock modes include at least two of the following: an unlock mode based on NFC, a digital password unlock mode, and a fingerprint unlock mode.

In a possible design, the MCU 1002 has a Bluetooth function.

In a possible design, the MCU 1002 is further configured to: control the fingerprint identification module to be powered off when the fingerprint identification module is in an idle state.

The smart lock provided in the embodiment of the present application can be used to perform the data management method implemented on the side of the smart lock described above. For content and effects thereof, reference may be made to the method embodiment portion, and details will not be described again.

Figure 11:
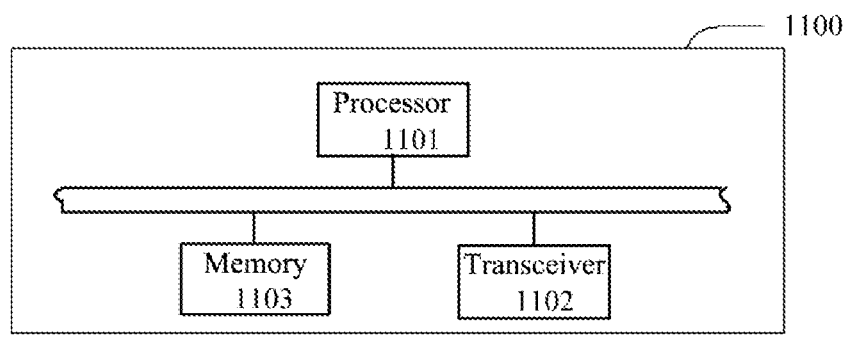
FIG. 11 is a schematic diagram illustrating a terminal device 1100 according to an embodiment of the present application.

FIG. 11 is a schematic diagram illustrating a terminal device 1100 according to an embodiment of the present application. Among others, a smart lock includes respective databases corresponding to N unlock modes, where N is an integer greater than 1; and the terminal device 1100 includes: a processor 1101, a transceiver 1102, and a memory 1103. The transceiver 1102 is configured to perform data transmission with the smart lock or a server.

The memory 1103 is configured to store a computer instruction to cause the processor 1101 to perform the data management method on the side of the terminal device described above. For content and effects thereof, reference may be made to the method embodiment portion, and details will not be described again.

The present application further provides a data management system for a smart lock, including: the data management apparatus for the smart lock as shown in FIG. 8 or the smart lock as shown in FIG. 10, and the data management apparatus for the smart lock as shown in FIG. 9 or the terminal device as shown in FIG. 11. For content and effects thereof, reference may be made to the method embodiment portion, and details will not be described again.

The present application further provides a computer storage medium which includes a computer instruction for implementing the data management method for the smart lock as described above. For content and effects thereof, reference may be made to the method embodiment portion, and details will not be described again.

The present application further provides a computer program product which includes a computer instruction for implementing the data management method for the smart lock as described above. For content and effects thereof, reference may be made to the method embodiment portion, and details will not be described again.

Persons of ordinary skill in the art may understand that, all or a part of the steps of the foregoing method embodiments may be implemented by hardware associated with a program instruction. The foregoing program may be stored in a computer readable storage medium. When the program runs, the steps included in the foregoing method embodiments are performed. The foregoing storage medium includes various mediums capable of storing program codes, such as an ROM, an RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present invention.

What is claimed is:

1. A data management method for a smart lock, wherein the smart lock has N databases, the N databases have a one-to-one correspondence with N unlock modes, N is an integer greater than 1, and the method comprises:
    receiving a registration command transmitted by a terminal device;
    acquiring first unlock information of a current unlock mode according to the registration command, wherein the current unlock mode is comprised in the N unlock modes;
    storing the first unlock information of the current unlock mode into a database corresponding to the current unlock mode, wherein the database corresponding to the current unlock mode is comprised in the N databases;
    acquiring second unlock information of the current unlock mode;
    identifying the second unlock information of the current unlock mode in the database corresponding to the current unlock mode; and
    controlling the smart lock to be in an open state when the second unlock information of the current unlock mode is successfully identified.

2. The method according to claim 1, further comprising:
    receiving a delete command transmitted by the terminal device, wherein the delete command comprises the first unlock information of the current unlock mode; and
    deleting the first unlock information of the current unlock mode from the database corresponding to the current unlock mode according to the delete command.

3. The method according to claim 1, further comprising:
    generating an operation record from a user for the smart lock; and
    transmitting the operation record to a server to allow the server to store the operation record, or transmitting the operation record to the terminal device so that the user queries the operation record of the smart lock through the terminal device.

4. The method according to claim 3, wherein:
    the smart lock communicates with the terminal device through a Bluetooth mode, correspondingly, the transmitting the operation record to the terminal device comprises:
    transmitting the operation record to the terminal device through the Bluetooth mode;
    or,
    the smart lock communicates with the terminal device through a second generation (2G) mobile communication mode, a third generation (3G) mobile communication mode, a fourth generation (4G) mobile communication mode, a cellular-based Narrow Band Internet of Things (NB-IoT) communication mode, a LoRa communication mode or a wireless fidelity (WiFi) communication mode, correspondingly, the transmitting the operation record to the terminal device comprises:
    transmitting the operation record to the server through 2G, 3G, 4G, NB-IoT, LoRa or WiFi, so that the server forwards the operation record to the terminal device through the 2G, 3G, 4G or Internet of Things.

5. The method according to claim 4, wherein:
    when the smart lock communicates with the terminal device through the Bluetooth mode, an application layer protocol used by the smart lock and the terminal device is a constrained application protocol (COAP);
    when the smart lock communicates with the terminal device through the 2G, 3G, 4G, NB-IoT, LoRa or WiFi, an application layer protocol used by the smart lock and the server is a COAP or a message queuing telemetry transport (MQTT) protocol.

6. The method according to claim 5, wherein when the smart lock communicates with the terminal device through the Bluetooth mode, a data packet transmitted between the smart lock and the terminal device successively comprises: a preamble of data to be transmitted, a length field of the data to be transmitted, the data to be transmitted, and a cyclic redundancy check (CRC) calculated according to the length field of the data to be transmitted and the data to be transmitted.

7. The method according to claim 1, wherein the smart lock comprises a plurality of modules; correspondingly, the method further comprises:
    receiving a query request transmitted by the terminal device, wherein the query request is used to request to query an operating state of at least one of the plurality of modules; and
    transmitting a query response to the terminal device, wherein the query response comprises an operating state of at least one of the plurality of modules.

8. The method according to claim 1, wherein the N unlock modes comprise at least two of the following: an unlock mode based on near field communication (NFC), a digital password unlock mode, and a fingerprint unlock mode.

9. A data management method for a smart lock, wherein the smart lock has N databases, the N databases have a one-to-one correspondence with N unlock modes, N is an integer greater than 1, and the method comprises:
    acquiring a user operation on a registration interface;
    generating a registration command according to the user operation;
    transmitting the registration command to the smart lock, wherein the registration command is used to acquire first unlock information of a current unlock mode and the first unlock information of the current unlock mode is stored in a database corresponding to the current unlock mode, wherein the current unlock mode is comprised in the N unlock modes, and the database corresponding to the current unlock mode is comprised in the N databases; and
    transmitting second unlock information of the current unlock mode to the smart lock, wherein the second unlock information of the current unlock mode is used to determine whether to control the smart lock to be in an open state.

10. The method according to claim 9, further comprising: transmitting a delete command to the smart lock, wherein the delete command comprises the first unlock information of the current unlock mode, and the delete command is used to delete the first unlock information of the current unlock mode from the database corresponding to the current unlock mode.

11. A smart lock, wherein the smart lock has N databases, the N databases have a one-to-one correspondence with N unlock modes, N is an integer greater than 1; and comprising: a transceiver, a micro controller unit (MCU), a fingerprint identification module, and a memory;
wherein the transceiver is configured to receive a registration command transmitted by a terminal device;
the MCU or the fingerprint identification module is configured to acquire first unlock information of a current unlock mode according to the registration command, wherein the current unlock mode is comprised in the N unlock modes; and
the memory is configured to store a database corresponding to the current unlock mode, and the database comprises the first unlock information of the current unlock mode, wherein the database corresponding to the current unlock mode is comprised in the N databases;
wherein the MCU or the fingerprint identification module is further configured to:
acquire second unlock information of the current unlock mode;
identify the second unlock information of the current unlock mode in the database corresponding to the current unlock mode; and
control the smart lock to be in an open state when the second unlock information of the current unlock mode is successfully identified.

12. The smart lock according to claim 11, wherein the transceiver is further configured to receive a delete command transmitted by the terminal device, wherein the delete command comprises the first unlock information of the current unlock mode; and
the MCU or the fingerprint identification module is further configured to delete the first unlock information of the current unlock mode from the database corresponding to the current unlock mode according to the delete command.

13. The smart lock according to claim 11, the MCU or the fingerprint identification module is further configured to generate an operation record from a user for the smart lock; and
the transceiver is further configured to: transmit the operation record to a server to allow the server to store the operation record, or transmit the operation record to the terminal device so that the user queries the operation record of the smart lock through the terminal device.

14. The smart lock according to claim 13, wherein:
the smart lock communicates with the terminal device through a Bluetooth mode, correspondingly, the transceiver is specifically configured to: transmit the operation record to the terminal device through the Bluetooth mode;
or,
the smart lock communicates with the terminal device through 2G, 3G, 4G, NB-IoT, LoRa or WiFi, correspondingly, the transceiver is specifically configured to transmit the operation record to the server through the 2G, 3G, 4G, NB-IoT, LoRa or WiFi, so that the server forwards the operation record to the terminal device through the 2G, 3G, 4G, NB-IoT, LoRa or WiFi.

15. The smart lock according to claim 14, wherein:
when the smart lock communicates with the terminal device through the Bluetooth mode, an application layer protocol used by the smart lock and the terminal device is a COAP;
when the smart lock communicates with the terminal device through the 2G, 3G, 4G, NB-IoT, LoRa or WiFi, an application layer protocol used by the smart lock and the server is a COAP or an MQTT protocol.

16. The smart lock according to claim 15, wherein when the smart lock communicates with the terminal device through the Bluetooth mode, a data packet transmitted between the smart lock and the terminal device successively comprises: a preamble of data to be transmitted, a length field of the data to be transmitted, the data to be transmitted, and a CRC calculated according to the length field of the data to be transmitted and the data to be transmitted.

17. A non-transitory computer storage medium, comprising: a computer instruction for implementing the data management method for the smart lock according to claim 1.

* * * * *